United States Patent [19]
Brown et al.

[11] Patent Number: 5,988,399
[45] Date of Patent: *Nov. 23, 1999

[54] SPIN-ON FILTER

[75] Inventors: Gene W. Brown; David A. Biere, both of Kearney, Nebr.

[73] Assignee: Baldwin Filters, Inc., Kearney, Nebr.

[*] Notice: This patent is subject to a terminal disclaimer.

[21] Appl. No.: 08/996,801

[22] Filed: Dec. 23, 1997

[51] Int. Cl.⁶ .................................................. B01D 27/08
[52] U.S. Cl. .................... 210/440; 210/443; 210/DIG. 17
[58] Field of Search .................................. 210/440, 443, 210/444, 450, 453, 455, DIG. 17, 435

[56] References Cited

U.S. PATENT DOCUMENTS

| | | | |
|---|---|---|---|
| 3,315,809 | 4/1967 | Hultgren | 210/440 |
| 3,434,601 | 3/1969 | Barth et al. | 210/440 |
| 4,743,374 | 5/1988 | Stifelman | 210/440 |
| 4,834,885 | 5/1989 | Misgen et al. | 210/440 |
| 5,080,787 | 1/1992 | Brown et al. | 210/232 |
| 5,453,195 | 9/1995 | Jorgenson et al. | 210/444 |
| 5,490,930 | 2/1996 | Krull | 210/443 |
| 5,525,226 | 6/1996 | Brown et al. | 210/443 |

*Primary Examiner*—Matthew O. Savage
*Attorney, Agent, or Firm*—Leydig, Voit & Mayer Ltd.

[57] ABSTRACT

A spin-on filter including an improved baseplate preferably die cast from aluminum and an improved seaming lid preferably stamped from sheet steel. The baseplate includes a hub joined to a rim by ribs. The rim includes slots that receive tabs from the stamped seaming lid to provide for torque transfer between the canister and baseplate. The baseplate provides a seat for the seaming lid interfit with the baseplate to form a outer gasket groove. The baseplate provides the groove inner wall, while the seaming lid provides the groove outer wall and base. The inventive design in the baseplate and seaming lid provide for a groove for receiving an outer gasket and for torque transfer without complex or costly manufacture.

24 Claims, 8 Drawing Sheets

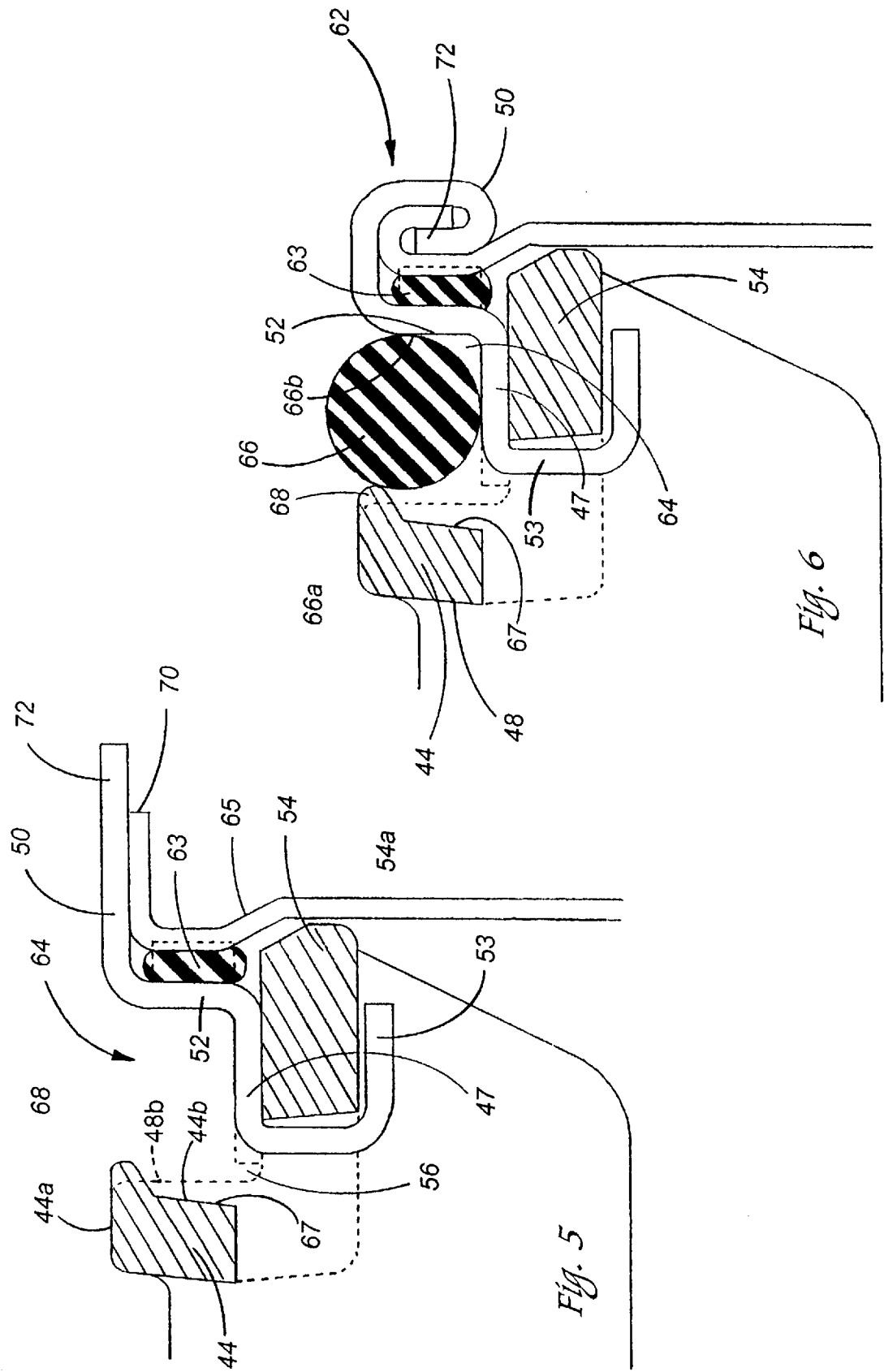

SPIN-ON FILTER

FIELD OF THE INVENTION

This invention relates to a filter for separating contaminants from fluids such as lubricating oil, hydraulic fluid, and the like. More specifically, this invention relates to a spin-on filter adapted to thread onto a mounting adaptor of a hydraulic circuit, lubrication system or other fluid system.

BACKGROUND OF THE INVENTION

Spin-on filters are commonly used to separate contaminants from fluid. Spin-on filters typically mount on a mounting adaptor of a fluid circuit and receive and return fluid therefrom. Spin-on filters typically include a steel canister housing a filter element, having a closed end and an open end. At the open end, the filter has provided a connection to the mounting adaptor. The connection requires a flow path for contaminated fluid into the canister and a flow path for filtered fluid out of the canister. Threaded baseplates have commonly been used for the connection.

It is known that many lower pressure and a number of higher pressure applications exist which can be satisfied by spin-on type filters. Lower strength filters are used for lower pressure applications, pressures less than 100 p.s.i., for example in a lubrication circuit for an automobile. Current applications in hydraulics frequently use pressure differential between the high strength filters. These high strength filters are used in the hydraulic circuits of heavy machinery for use in industries such as agriculture or construction, for example, a hydraulic circuit for a backhoe which powers the shovel motion. In such hydraulic circuit applications, the filter must withstand the high pressure inside the filter and the ambient pressure outside the filter. Such applications may require that the filter be capable of withstanding pressure spikes in excess of 750 p.s.i. and impulse strength of at least 0–300 p.s.i. for sustained periods without leakage or failure.

Because of the high pressure requirements, it is preferable to have high tensile strength in the baseplate. It is also desirable to provide a baseplate that is of low cost to manufacture and assemble into the filter. Stamped steel has commonly been used for baseplates. However, aluminum die cast baseplates have provided better strength and currently cost less to manufacture. It is therefore desirable to incorporate an aluminum baseplate into the filter. However, as will be discussed, aluminum baseplate type filters have had manufacturing, assembly and cost disadvantages with providing an adequate connection to the mounting adaptor of a hydraulic circuit.

Insofar as reliability and user convenience are concerned, an important element in spin-on filters is an outer gasket which will remain in position on the filter until locked in sealing relationship with the mounting adaptor of a hydraulic circuit. Outer gaskets prevent fluid leakage between the mounting adaptor and the filter. Often, the outer gasket is installed in and preferably secured in an outer groove on the filter. It is particularly desirable to secure the outer gasket in the groove so that it does not fall out during transport or installation. To retain the outer gasket, at least one of the groove's walls typically includes a reverse draft and/or a mechanism to pinch the outer gasket in the groove.

Also common to spin-on type filters is that the baseplates have been fastened to the canister. Burst strength requirements for a filter necessitates a seaming lid fastening technique which provides a connection capable of withstanding the pressure differential applied from fluid pressure inside of the filter to the ambient outside. The fastening technique also requires torque transfer. Torque transfer has been necessary in spin-on filters because the threaded connection is commonly in the baseplate. When the canister is screwed on or off the adaptor, torque is transferred from the steel canister to the baseplate. Various methods and mechanisms have been employed to fasten the baseplates to the steel canister.

A common way of fastening the canister and baseplate has been to use a seaming lid. Seaming lids are typically stamped from sheet steel. The outer edge of the seaming lid is meshed with an edge of the canister sidewall to form a seam. Such a seaming lid and seam is shown and described in U.S. Pat. Nos. 5,490,930, to Krull, and 5,453,195, to Jorgenson et al., both assigned to the present assignee. As shown and described in Jorgenson et al. '195, the seaming lid technique has sufficiently fastened the baseplate to the canister. However, one drawback of many prior seaming lid approaches has been that the seaming lid is welded to the baseplate providing the torque transfer necessary for spin-on filters. Welding has not allowed for aluminum baseplates. Moreover, the step of welding can increase manufacturing costs. Another drawback of prior seaming lid fastening techniques has been that the outer gasket retaining groove which is often U-shaped has commonly been formed entirely in the seaming lid. Thus, additional forming and drawing of the sheet steel has been necessary which has decreased strength and increased costs.

Steel seaming lids have also been interlocked to stamped steel baseplates providing the necessary torque transfer. The seaming lids in these filters have provided tabs that fold through the oil inlet ports of the baseplate to provide torque transfer. However, this design undesirably has a substantially flat baseplate. The flat baseplate design has been necessary to provide a flatter, less formed structure in the seaming lid. These flat baseplates are undesirable because they do not permit the strength enhancing structural features desired for aluminum baseplate type filters for high pressure applications. Another very substantial drawback of these flat baseplate filters has been that the outer groove is formed entirely by the seaming lid. Further forming of sheet steel has been necessary to form the outer gasket retaining groove and outer gasket retaining mechanism in the seaming lid which has the cost and strength drawbacks mentioned above.

Other past designs have fastened the baseplate directly to the canister without a seaming lid as shown in U.S. Pat. Nos. 5,080,787; 4,743,374 and 4,834,885. Some of these filter designs have provided for aluminum die cast baseplates and high pressure applications. Filters without a seaming lid generally bead or wrap the a portion of the open end of a canister over a preformed shoulder in the baseplate. However, filter designs without a seaming lid have had manufacturing disadvantages and require additional tooling. Specifically, it has been difficult to provide for satisfactory burst strength while at the same time providing torque transfer between the canister and the baseplate and an outer gasket groove. Further drawing of the canister has often been necessary to provide a retaining groove and torque transfer which may reduce strength of the filter and increase manufacturing cost.

Another drawback is that additional geometry and small tolerances have often been necessary in the die cast of the aluminum baseplate to provide a retaining groove. Thus, the manufacturing of filters without a seaming lid has required additional geometry in the baseplate, additional parts and/or additional complex tooling to draw the sheet steel from the canister around the baseplate to sufficiently fasten the baseplate to the canister and provide a retaining groove.

SUMMARY OF THE INVENTION

A general aim of the present invention is to provide a filter having a baseplate and a seaming lid with an improved approach for providing an outer gasket groove while sufficiently fastening the baseplate to a canister.

Another general aim of the present invention is to provide a seaming lid and baseplate that can be used in high pressure hydraulic circuits in addition to other lower pressure applications.

Another general aim of the present invention is to provide a filter having a low cost baseplate and a low cost seaming lid with low filter assembly costs.

A specific object of the present invention is to provide a seaming lid type filter using an aluminum die cast baseplate that provides for strength.

Another specific object of the present invention is to provide a filter having a seaming lid that is readily stamped but can be securely fastened to a structural baseplate to provide torque transfer and burst strength.

In that regard, it is an additional object to provide such a filter with an integral and reliable outer gasket retaining groove.

Another specific object of the invention is to provide for a method of manufacturing a filter with limited forming of sheet steel to provide an outer gasket retaining groove.

In achieving those aims and objectives, it is a feature that the present invention provides for a low cost and simplified baseplate assembly. The baseplate assembly comprises a baseplate and a seaming lid that readily inter-fit without costly assembly or manufacture.

Another feature of the present invention is that the baseplate interfitted with the seaming lid provides an outer gasket retaining groove. The baseplate provides an inner groove wall and a seating flange for receiving the seaming lid. The seaming lid fits into the seat to complete the formation of the outer gasket groove. The seaming lid provides the base and the outer wall of the groove.

It is a yet another feature that the baseplate and the seaming lid interfit to provide for torque transfer between the baseplate and the filter canister. The seaming lid provides tabs that readily fit through slots located in an outer rim of the baseplate. By folding the tabs around a rim portion of the baseplate, the baseplate is secured to the seaming lid.

It is yet another feature of the invention to reduce the steps necessary in manufacturing the filter. Accordingly, sheet steel is readily stamped to form a generally stepped shaped seaming lid. The seaming lid provides tabs that are fit through slots in the baseplate. The tabs are then crimped to the baseplate to form the baseplate assembly. The baseplate assembly is then seamed to the canister to complete the filter.

It is yet another feature of the invention to provide for adapting the filter for lower or higher strength applications. The present invention comprises an aluminum baseplate that provides structural features for improved burst strength. According to an embodiment of the invention, two inner seals are provided to reduce fluid pressure on the seam which improves burst strength. A circular vertical flange on the seaming lid and a accommodating cylindrical channel slot in the baseplate improve strength characteristics. The tabs are further bent around a thicker rim portion of the baseplate to also improve strength.

These and other objects and advantages of the invention will become more apparent from the following detailed description when taken in conjunction with the accompanying drawings.

BRIEF DESCRIPTION OF THE DRAWINGS

FIG. 5 is an enlarged fragmentary cross-sectional view taken about line 6 of FIG. 1, but in a pre-seamed state showing a retaining groove after forming a neck on a canister.

FIG. 6 is an enlarged fragmentary cross-sectional view taken about line 6 of FIG. 1 showing a retaining groove in a post-seamed state, with outer gasket.

Figure 1:
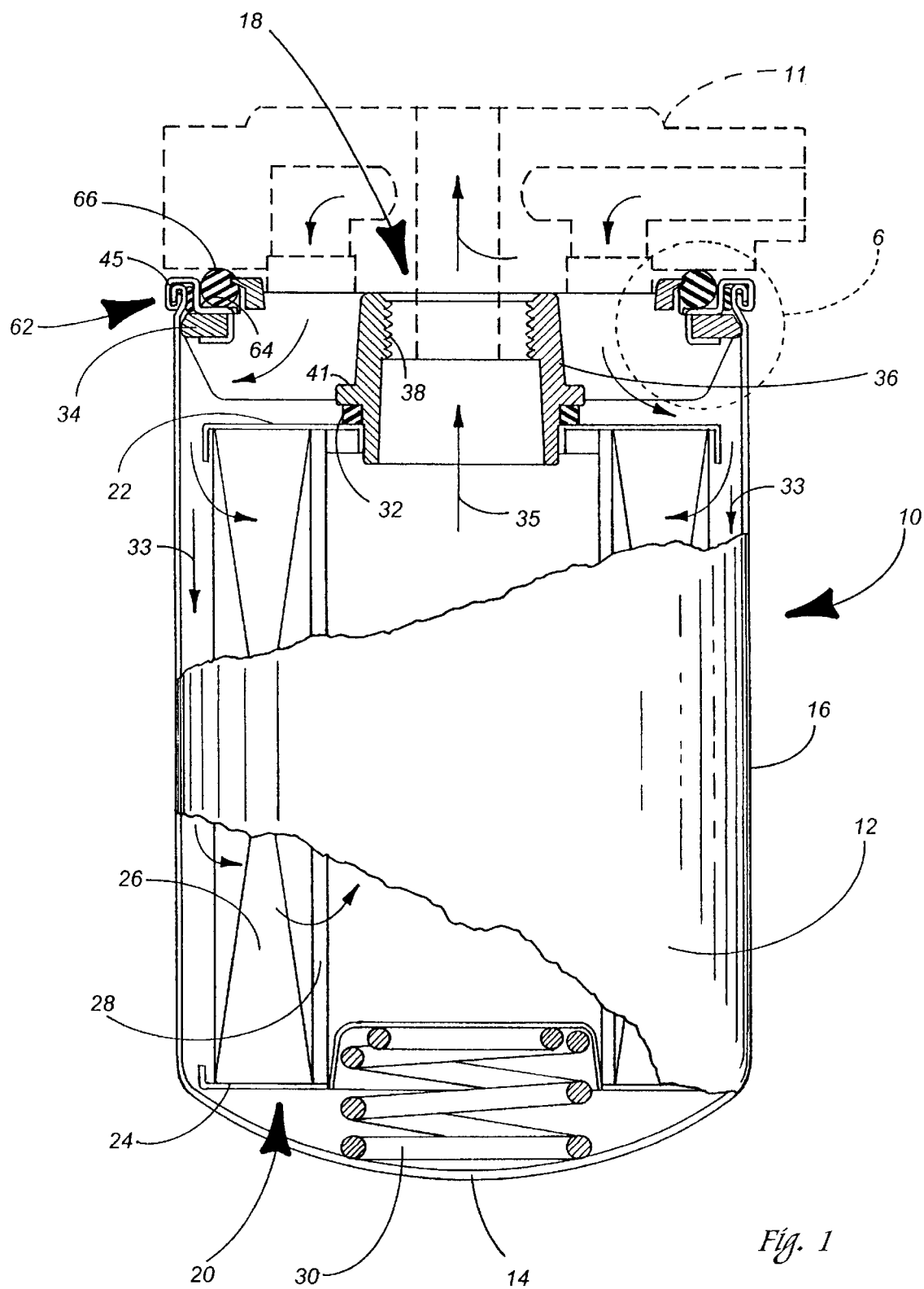
FIG. 1 comprises a cross-sectional view of a filter according to a preferred embodiment of the present invention with hidden lines showing a mounting adaptor to which the filter is attached.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Turning to the drawings, attention will first be directed to a first embodiment depicted in FIGS. 1–6 that exemplifies various features of the present invention. Attention will then be directed to FIG. 7–9 which illustrates preferred strength enhancing features and other features not provided to the filter depicted in FIG. 1. For purposes of illustration and referring to FIG. 1, the preferred embodiment of the invention has been shown in the drawings as embodied in a spin-on filter 10 typically used for filtering contaminated fluid. The filter is spun onto a threaded portion of a mounting adaptor 11 to a fluid circuit. As can be appreciated by those skilled in the art, the mounting adaptor 11 includes an outlet for contaminated fluid and an inlet for filtered fluid.

Figure 2:
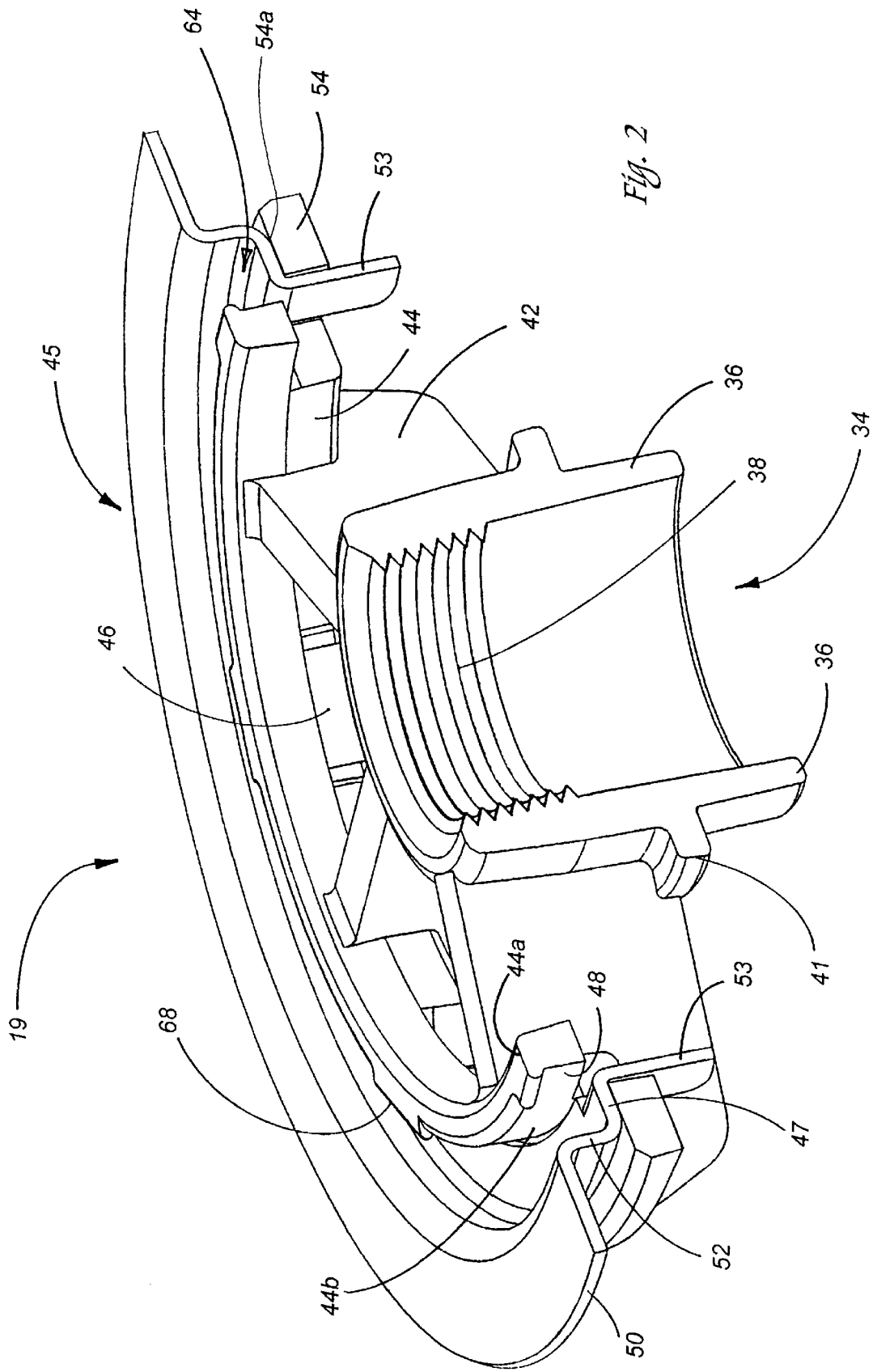
FIG. 2 is a perspective sectional view of a baseplate assembly according to the same present invention.
Figure 3:
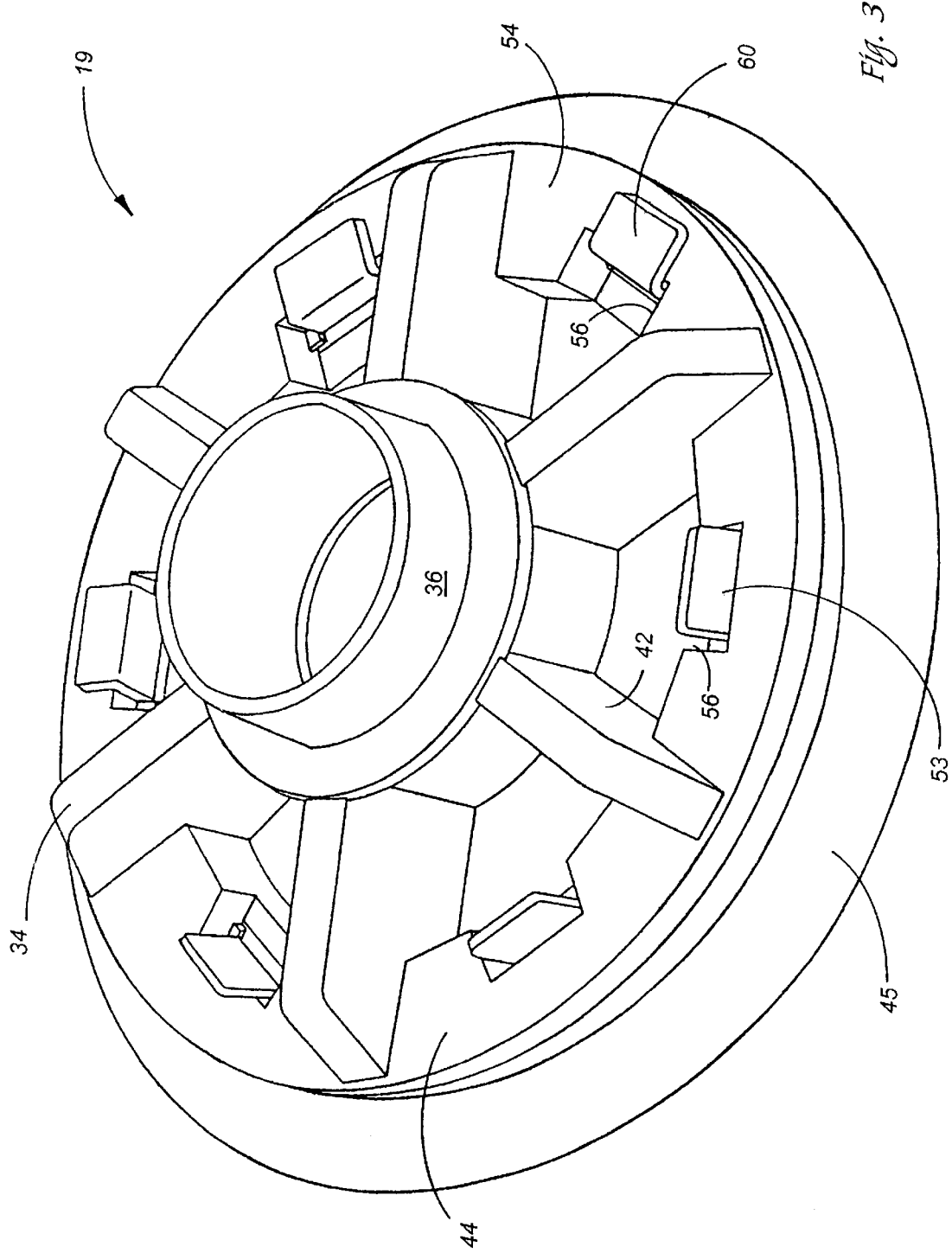
FIG. 3 is a perspective view of the bottom of a baseplate assembly according to the same present invention.

The filter 10 includes a deep drawn canister 12 made of relatively heavy gauge sheet steel. The canister 12 has a closed end 14, a longitudinally extending cylindrical sidewall 16, and an open end 18. A base plate assembly 19, shown separately in more detail in FIGS. 2 and 3, is fastened at the open end 18 of the canister 12 and provides a fluidic connection to the mounting adaptor 11 of the hydraulic circuit.

The canister 12 houses a tubular filter element 20 generally concentric to the sidewall 16. As shown in the present embodiment, the filter element 20 comprises two end caps 22, 24, suitable filter media 26 for removing contaminants from fluid, and a perforated metal center tube 28. A coil spring 30 engages the filter element 20. The upper end cap 22 includes a circular hole 31 (see FIG. 4) which interfits with the baseplate assembly 19. The coil spring 30 compressed between the closed end 14 and the filter element 20, urges the filter element 20 against the baseplate assembly 19 thereby compressing an inner seal 32. The inner seal 32 prevents leakage between the baseplate assembly 19 and the filter element 20. The center tube 28 provides radial support for the filter element 20.

Contaminated oil or other fluid from the mounting adaptor 11 flows through the baseplate assembly 19 and into the canister 12 and along an outer flow path, represented by arrow 33, on the outside of the filter element 20. Fluid pressure forces the oil radially inward through the filter element 20 removing contaminants from the oil. Clean oil flows upward along an inner flow path, represented by arrow 35, in the upper end cap 22 and flows through the inside of the baseplate assembly 19 back to the mounting adaptor 11.

The filter of this invention can be adapted for high pressure hydraulic circuits which requires high strength in the baseplate. Accordingly, the exemplified embodiment provides a baseplate 34 that is die cast aluminum. The baseplate 34 is shown separate from the filter in FIG. 4 and as part of the baseplate assembly 19 in FIGS. 2 and 3. Although a steel baseplate could work in the present invention, die casting an aluminum baseplate is preferred because the extensive design and thickness options provide for greater flexibility in filter design. Manufacturing costs are also reduced by die casting aluminum. The design of the baseplate 34 in the present invention also reduces the complexity of the filter 10, thereby reducing the machining and parts necessary to manufacture the filter 10.

The present embodiment provides a baseplate 34 that serves several functions while maintaining strength. The baseplate 34 includes a hub 36 w th threads 38 that provide a connection to the mounting adaptor 11. The hub 36 is hollow enabling clean fluid to flow from the canister 12 to the mounting adaptor along inner flow path 35. The hub 36 interfits w th the hole 31 in the filter element 20. The hub 36 includes a lip 41 radially about a midsection of the hub 36 and sized larger than hole 33. The filter element 20 is biased against the lip 41 with an inner seal 32 compressed therebetween. The inner seal 32 prevents leakage of contaminated fluid in flow path 33 into the clean fluid in flow path 35.

Figure 4:
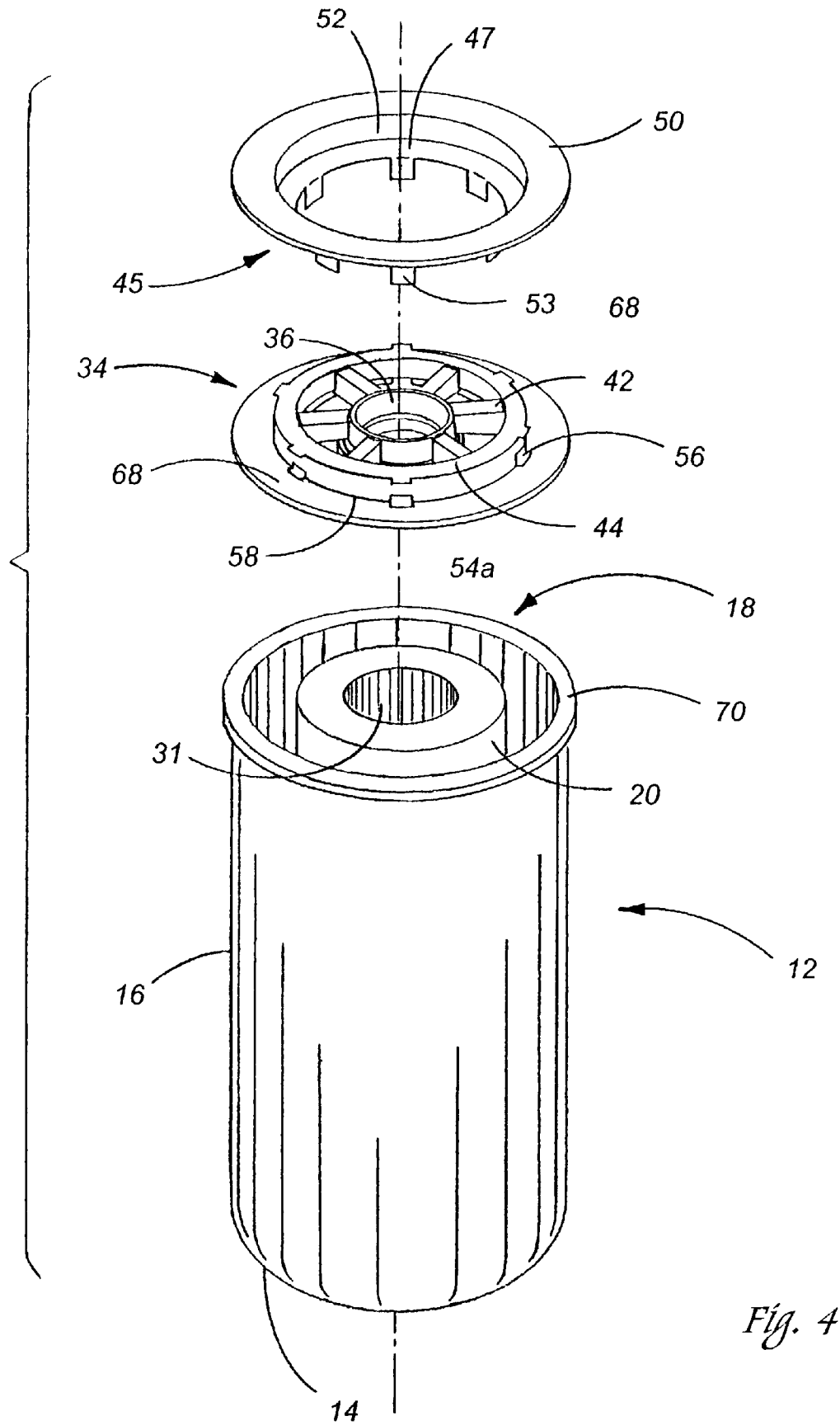
FIG. 4 comprises an pre-assembly exploded view of a canister housing a filter element, a baseplate, and a seaming lid according to the same present invention.

Referring now to FIGS. 2, 3, and 4, the baseplate 34 includes multiple radially extending ribs 42 joining the hub 36 to a rim 44. A plurality of fluid inlet port orifices 46 are defined between the ribs 42 enabling contaminated fluid to flow into the canister 12 along outer flow path 33. To provide strength and flow area, the ribs 42 are generally thicker along the axis of the hub 36, and thinner radial plane created by the hub 36.

In spin-on filters as in the present invention, radial force or torque is applied to the canister 12 to complete the threaded connection to the mounting adaptor 11. Therefore, the canister 12 transfers torque to the baseplate 34 which provides the threads 38. As such, the exemplified embodiment of the present invention also provides a seaming lid 45 to transfer torque from the canister to the baseplate 34. The seaming lid 45 also secures the baseplate 34 to the canister 12, while resisting high pressure pulses without bursting or leakage. The baseplate 34 and the seaming lid 45 form the baseplate assembly 19.

The inventive geometry of the present embodiment permits the simple stamping of sheet metal to form the seaming lid 45 with relatively simple and inexpensive tooling. The seaming lid 45 is shown as stamped in FIG. 4 and as assembled into the baseplate assembly 19 in FIGS. 2 and 3. Referring now to FIGS. 2 and 4, it is seen that the seaming lid 45 has a disc-shaped peripheral ring 47, which is generally radially planar. The peripheral ring 47 has an inner diameter which is sized larger than an outer diameter associated with a cylindrical wall 48 portion of the baseplate rim 44. The seaming lid 45 includes an outer seaming edge 50 joined in a stepped fashion to the peripheral ring 47 by a generally cylindrical erect wall 52. The peripheral ring 47 provides a plurality of tabs 53 extending axially opposite the erect wall 52 to be received by the baseplate 34.

In accordance with the aims, objects and features of the invention, the present embodiment of baseplate 34 includes a rim 44 having several structural features which interact and interfit with the seaming lid 45. The rim 44 includes a peripheral flange 54 extending radially outward from the cylindrical wall 48. The flange 54 provides a generally planar disc-shaped seating surface 54a for receiving a peripheral surface of the planar disc-shaped ring 47. The rim 44 also includes a plurality of slots 56 spaced for receiving the tabs 53 in a close fitting fashion. The slots 56 are spaced evenly on the flange 54 near a corner 58 between the flange seating surface 54a and the rim wall 48.

In the baseplate assembly 19 shown in FIGS. 2 and 3, the seaming lid 45 is closely fitted onto the seating surface 54a with the tabs 53 being closely fitted into the slots 56. The tabs 53 and accommodating slots 56 provide for torque transfer between the seaming lid 45 and the baseplate 34. It will be apparent that the embodiment provides torque transfer without welding. The present embodiment also provides torque transfer without drawing portions of sheet steel which carry stress from high fluid pressure inside the filter during operation, such as the sheet steel of the canister 12.

Referring now to FIG. 3, it is seen that end portions 60 of the tabs 53 are crimped to the flange 54 portion of the rim 44 to secure the baseplate 34 to the seaming lid 45. Crimped or crimping of the tabs 53 includes any deformation of the tabs 53 that sufficiently secures the baseplate to seaming lid. As best shown in FIGS. 1, 5 and 6, the outer edge 50 is deformed or seamed to the sidewall 16 of canister 12 forming a seam 62. The seam 62 fastens the seaming lid 45 to the canister 12 to secure the baseplate in the canister 12. The seam 62 resists high pressure inside to prevent the filter 10 from bursting and the canister 12 from moving outward from the baseplate 34. Although the seam 62 may be liquid-tight by itself, the present embodiment provides a seam seal 63 inserted between a neck 65 of the canister 12 and the erect surface 52 to ensure liquid tightness. The seal 63 reduces fluid pressure on the seam 62 which further prevents bursting of the filter 10. The neck 65 is commonly formed during normal seaming operations of the seaming lid 34 and sidewall 16. The neck 65 preferably has an inner diameter larger the outer diameter of the baseplate rim to transfer some of the stress from the canister 12 to the baseplate 34 directly without the seaming lid 45.

Attention will now be directed at an inventive groove 64 for receiving an outer gasket 66 in the present embodiment. In accordance with the aims, objects and features of the present invention, the exemplary embodiment includes an improved approach for providing a retaining groove while sufficiently fastening the baseplate to the canister. The groove 64 is formed by locating the peripheral ring 47 of seaming lid 45 onto the seating surface 54a of the baseplate 34. Shown in further detail in FIGS. 5 and 6, the groove 64 has a radially outer wall provided by the erect wall 52, a base provided by the peripheral ring 47, and a groove radially inner wall 48b provided the outer cylindrical wall 48 of the rim 44. By using the cylindrical wall 48 of the baseplate 34 in combination with the seaming lid 45 to provide the groove 64, simpler stamping of the sheet steel of the seaming lid 45 provides for the outer groove 64. Thus, less forming and less complex forming of the sheet steel is necessary to provide for the groove 64 which improves bursting strength of the filter 10 and reduces manufacturing costs.

Another advantage of having the groove inner wall provided by the baseplate 34 and not the seaming lid 45, is that the baseplate can provide a mechanical retaining mechanism for retaining an outer gasket 66 in the groove 64. In the present embodiment, the retaining mechanism comprises a plurality of lugs 68 die cast on the rim wall 48. The lugs 68 further reduce the complexity and forming of sheet steel necessary for the seaming lid 45 because the seaming lid 45 does not need a further draft to pinch the outer gasket 66 within the groove 64.

In further appreciation of the present invention, it will be seen that lugs 68 also reduce many difficulties associated with forming the groove 64 and inserting the outer gasket 66. As best shown in FIG. 2 the retaining means is provided by a plurality of lugs 68 projecting horizontally outward from a top portion 44a of the rim 44. In the present embodiment, the lugs are spaced evenly about the top portion 44a of the rim 44. As seen best in FIGS. 5 and 6 the lugs 68 do not extend to the flange seating surface 54a but instead recess back to a groove inner wall portion of the rim indicated at 44b. In this particular embodiment, the lugs 68 are spaced evenly over the slots 56 with a cutout segment indicated at 67 in between each lug and slot provided so that the tabs slidably fit through the slots more easily. Because the lugs 68 do not extend to the flange 54 the outer gasket can be stretched over the lugs to be inserted into the groove 64. After stretching the outer gasket 66 over the lugs and into the groove 64, the gasket will retain much of its original shape by having a portion indicated at 66a extend radially inward past the lugs 68 and toward the groove inner wall portion 44b. Although the horizontal lugs 68 in the present embodiment improve the fixation of the outer gasket in the groove, it will be understood that other forms of retaining means could be practiced with the present invention.

Although the assembly procedure for the filter 10 of the present invention has been described in some detail above, the preferred method of assembly described below reduces manufacturing steps, parts and cost. The primary components of the assembly procedure are shown in FIG. 4 and described below.

To form the canister 12, relatively heavy gage steel is drawn to provide the cylindrical sidewall 16, the closed end 14, and the open end 18 having a disc shaped brim 70 extending radially beyond the sidewall. the filter element 20 is then inserted into the canister 12.

To form the baseplate 34, aluminum is die cast to form the hub 36 with the lip 41 (shown in FIG. 1) residing radially about a midsection of the hub, and the rim 44 providing the retaining lugs 68 and the radially outwardly extending flange 54 with slots 56. As illustrated best in FIGS. 2 and 4, it may be seen that the retaining lugs 68 are die cast directly over and spaced evenly with the corresponding slots 68. This corresponding relationship between the lungs 68 and slots permits easier die casting of the baseplate because the corresponding molding die can comprise core pins (not shown) which extend up through the slots 56 to the lugs 68 from bottom side of the baseplate rim, the bottom side being opposite the side of the groove 64. By using molding core pins (not shown), the corresponding casting die (not shown) for the baseplate does not need any additional split to provide the slots and lugs which simplifies the casting. Threads 38 are tapped into the hub 36 to provide a connection for the mounting adaptor.

To form the seaming lid 45, sheet steel is stamped in a stepped fashion to interfit with the baseplate 34, by providing the outer edge 50 with the end portion 72 that radially extends just beyond the brim 70, the outer edge 50 joined by the generally cylindrical erect wall 52 to the radially planar peripheral ring 47 with tabs 53 extending therefrom, the tabs spaced to interfit with the slots 56.

Referring to FIG. 2 and 3, the baseplate 34 and the seaming lid 45 are interfit by locating the peripheral ring 47 on the flange 54. This forms the outer gasket groove 64. The tabs 53 are also received into the slots 56 to provide for torque transfer. To secure the baseplate 34 and seaming lid 45, end portions 60 of the tabs 53 are deformed about the rim 44 thereby affixing the baseplate 34 to the seaming lid 45 forming the baseplate assembly 19 with groove 64. The lugs 68 provided by the rim 44 provide retaining means for the groove 64. Preferably, a seam seal 63 may be fitted around the seaming lid 45 before insertion into the baseplate 34.

The baseplate assembly 19 is fitted into the canister with the hub 36 protruding into the filter element 20,and an inner seal 32 compressed between the lip 41 and the filter element 29. While an inner seal 32 is shown in the exemplified embodiment, other methods and placements for outer seals exist to prevent fluid transfer between the baseplate and the filter.

In the pre-assembled state shown best in FIGS. 4, 5, and 6, the canister 12 includes an radially outwardly extending disc shaped brim 70 and the seaming lid 45 includes an radially outwardly extending planar edge 50, having an end portion 72 extending beyond the brim 70. The outer edge 50 and the brim 70 are seamed by normal seaming operations to form a seam 62. In the exemplified embodiment of the present invention, seaming is accomplished by inwardly deforming the canister 12 near the brim 70 to form a neck 65 and thereby compressing the seam seal 63 as shown in FIG. 6. The end portion 72 of the outer edge 50 is then tightly curled around the brim 70. The brim 70 and outer edge 50 are deformed downwardly thereby forming a seam 62 as shown in FIG. 6. An outer gasket 66 is then inserted into the already pre-formed groove 64 to complete the filter.

Figure 7:
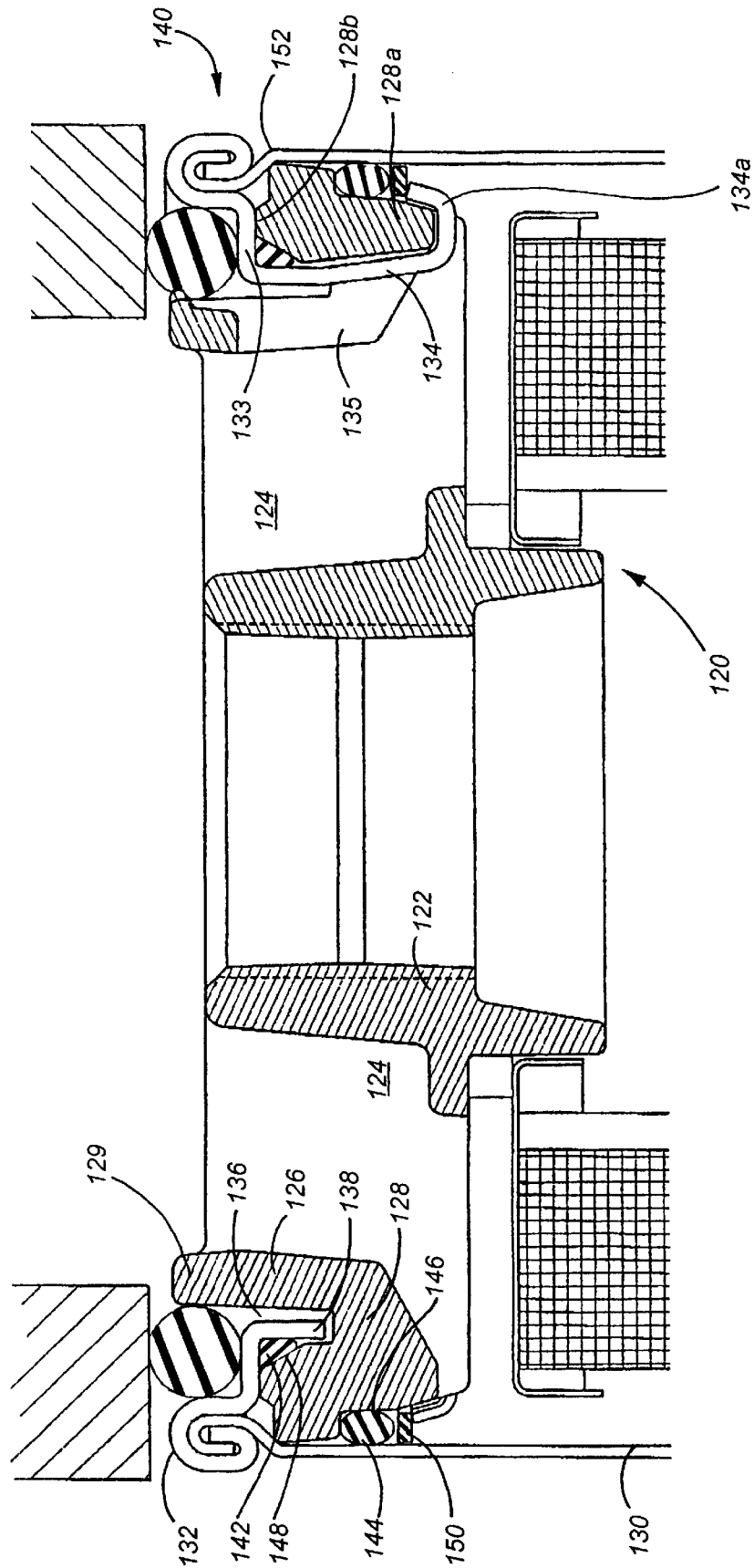
FIG. 7 is a cross-sectional fragmentary view of a filter illustrating an alternative embodiment of the present invention showing additional strength enhancing features for high pressure applications.

Turning now to a preferred embodiment exemplified in FIG. 7, a preferred strength enhanced filter 100 utilizing the inventive seaming lid and baseplate concepts of FIGS. 1–6 is exemplified. More specifically, the embodiment of FIG. 7 provides for an outer gasket groove and for torque transfer in a similar fashion as for the embodiments depicted in FIGS. 1–6, but with certain improvements intended to provide high pressure capacity. In can be understood that filter 100 filters fluid in much the same general manner as the previous embodiments depicted in FIGS. 1–6. However, filter 100 is provided with multiple preferred strength enhancing features not provided in FIGS. 1–6, and attention will now be directed to those features. In viewing FIG. 7 it will be appreciated that the inventive features provided by the present invention can be adapted for higher, intermediate or lower pressure fluid applications. The preferred strength enhancing features described and shown in FIG. 7 provides for a filter having a burst strength of at least 1000 p.s.i. and impulse strength of at least 0–300 p.s.i. for 100,000 cycles.

Referring now in greater detail to the filter 100 illustrated by FIG. 7, it is seen that the baseplate 120 is similar to baseplate 34 in FIG. 2. The baseplate 120 has a central hub 122 connected by ribs 124 to a rim 126. One strength enhancing feature is that the rim 126 includes a thicker flange portion 128 extending radially outward from a rim cylindrical wall 129 portion. To provide for fastening mechanism between the canister 130 and the baseplate 120, the present embodiment uses a seaming lid 132. The seaming 132 also includes a generally disc shaped peripheral ring 133 seated on a seating surface portion 128b of the flange 128 to form an outer gasket groove.

Similar to the previous embodiment, a plurality of tabs 134 from the seaming lid 132 are received by corresponding slots 135 in the flange 128. However, in the present embodiment, the tabs 134 are generally bent at greater than 90 degrees with an end portion 134a bent further around a narrower elongated bottom portion of the flange 128a. Further bending the an edge portion 134a around the flange bottom portion 128a, prevents the potential problem of the tabs 134 urging out of the slots 135 which may result from high fluid pressure from inside the filter 100 which urges the canister 130 outward and likewise the seamed seaming lid 132. Thus bending the tabs 134 at greater than 90 degrees further allows the filter 100 to withstand high pressure surges.

Another strength enhancing feature is that the flange 128 defines a continuous cylindrical slot-like channel 136 extending vertically into the flange 128. The seaming lid 134 has a continuous vertical cylindrical band 138 sized slightly smaller than the channel 136 and fitted into the channel 136. The band 136 extends from the peripheral ring 133 in a stepped and vertical fashion towards the inside of the canister 130. By providing band 138 and channel 136, pressure forcing the canister outward is relieved from the band 138 to the baseplate 120 via the walls of the channel 136. As also seen in FIG. 7 the cylindrical band 138 provides the tabs 134 fitted into the slots 135 which extends the tabs 134 further into the filter 100.

To minimize fluid pressure on the seam 140 which prevents leakage and bursting, inner gasket ring seals 142, 144 are assembled into the filter. The flange 128 has accommodating taper 146, and beveled ledge 148 for receiving and compressing the inner seals 142,144 respectively. Seal 142 is inserted over the seaming lid 134 and compressed against the baseplate 120 to prevent fluid transfer between seaming lid and baseplate. Seal 144 is inserted over the flange 128 and compressed against the canister 133 to prevent fluid transfer between the canister 130 and the baseplate 120. Also shown in FIG. 7 is a steel or plastic ring 150 held in place by the hook portion of the tab 134a. Ring 150 helps align and retain seal 144 during assembly of the filter. Yet an additional strength feature is that a neck portion 152 of the canister 130 transfers stress directly to the baseplate 120 in a similar manner as is discussed for neck 65 of the previous embodiment.

Figure 8:
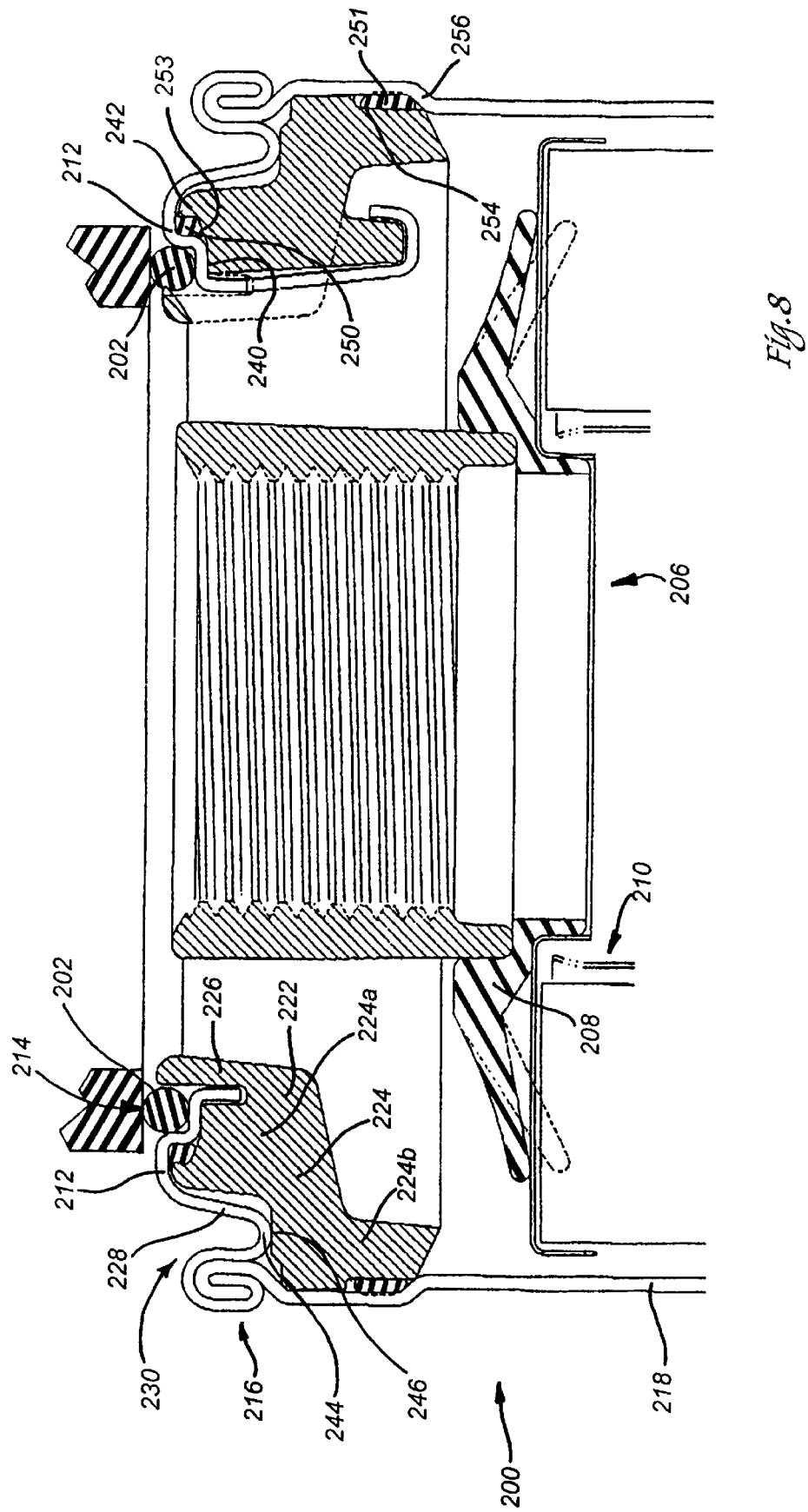
FIG. 8 is a cross-sectional fragmentary view of a filter illustrating an alternative embodiment of the present invention.

Turning now to a preferred embodiment exemplified in FIG. 8, a preferred strength enhanced filter 200 utilizing inventive seaming lid and baseplate concepts of FIGS. 1–7, and strength enhancing features of FIG. 7 is exemplified. In viewing FIG. 8, it will be better appreciated that the circular diameter of the filter 200 can be significantly larger than the circular ring diameter of the outer sealing gasket 202. It can be understood that filter 200 filters fluid in much the same general manner as the previous embodiments depicted in FIGS. 1–7, and provides improved strength in a similar manner as the previous embodiment depicted in FIG. 7. As such, attention will now be directed to those features differentiating the present embodiment from previous embodiments.

Referring now in greater detail to the filter 200, it is seen that a baseplate 206 is inserted into the filter 200 with a cartridge type seal 208 between the baseplate 206 and a filter element 210. The cartridge type seal 208 eliminates the need for lip 41 and inner seal 32, as was illustrated in FIG. 1. A seaming lid 212 interfits with the baseplate 206 to provide an outer gasket groove 214 and torque transfer. However, as can be seen in FIG. 8 the outer gasket groove 214 is radially disposed inward from a seam 216 which fastens the seaming lid and baseplate to a canister 218.

To provide for the inwardly disposed outer gasket groove 214, a baseplate rim 222 includes a flange portion 224 extending radially outward from a cylindrical rim wall 226 which also accommodates a radially extended outer edge portion of the seaming lid 212 generally indicated at 228. The flange 224 includes a radially inner portion 224a to provide for the outer gasket groove 214 and an outer portion flange 224b. The outer flange portion 224b is generally radially outward and axially disposed into the filter 200 to define a stepped recessed segment generally indicated at 230 to accommodate the seam 216 and radially extended outer edge 228. The inner portion 224a includes a seating surface 240 and an outer wall 242 which are covered by the seaming lid 212 to form the outer gasket groove 214. The outer edge 228 of the seaming lid 212 extends into the step recessed segment 230 with an annular segment 244 being in contact with a stepped recessed ledge 246. Pressure in the filter 200 which pushes the canister 200 outward is primarily carried by the seaming lid 212 at the annular segment 244.

To prevent fluid pressure in the filter 200 from reaching the seam 216, two ring seals 250, 251 with accommodating grooves defined by the baseplate at 253, 254 are provided. Ring seal 250 is generally disposed radially outward of the outer gasket 202 and compressed between the baseplate 206 and the seaming lid 212 to prevent fluid transfer therebetween. Ring seal 251 is compressed between the canister 218 and the baseplate 206 with a second neck portion 256 assisting in the compression to prevent fluid transfer between the baseplate 206 and the canister 218.

Figure 9:
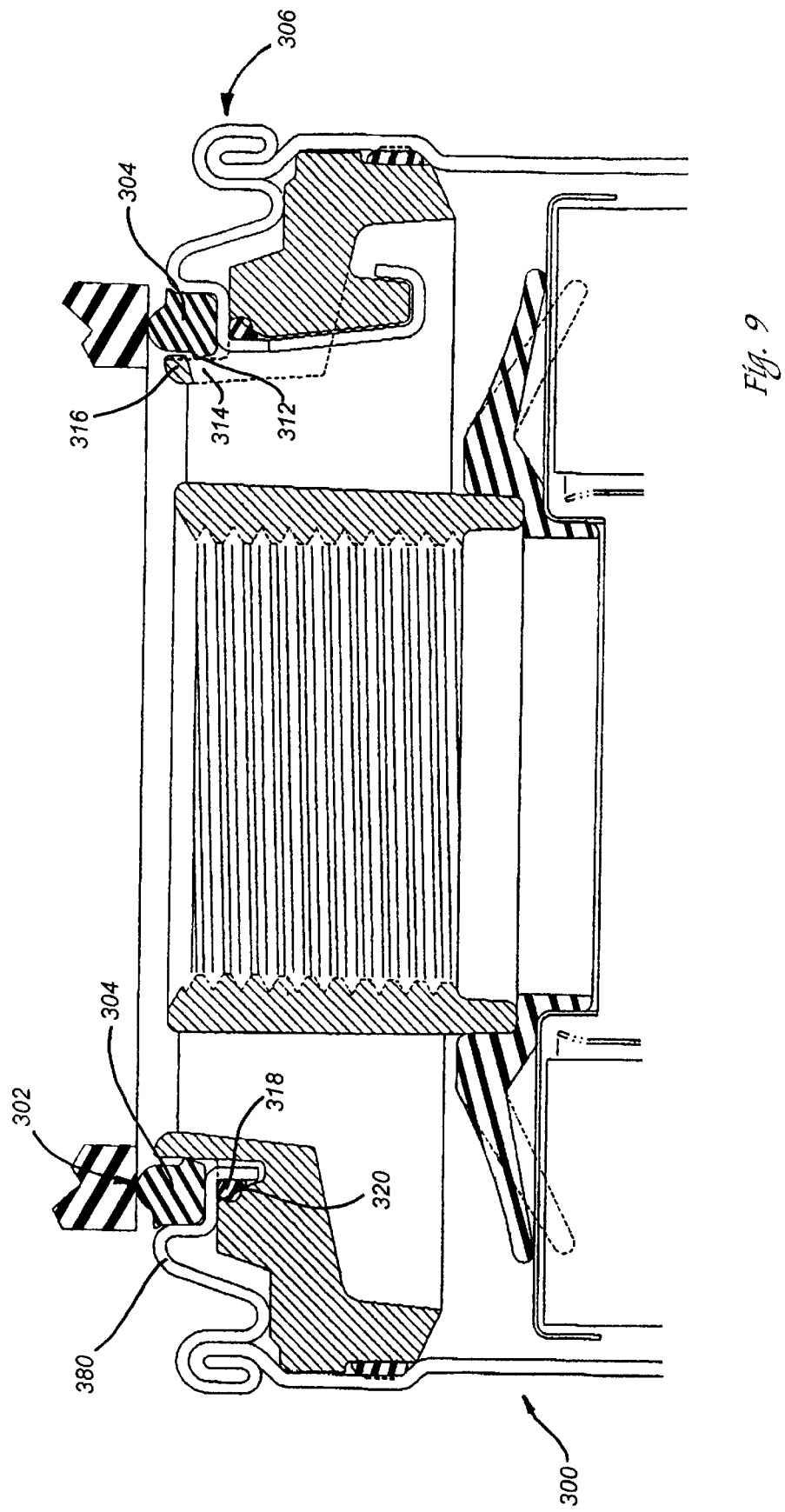
FIG. 9 is a cross-section fragmentary view of a filter illustrating an alternative embodiment of the present invention.

Yet another alternative embodiment of a filter 300 which is very similar to the embodiment shown in FIG. 8 is shown in FIG. 9. The embodiment of FIG. 9 also radially inward provides for an outer gasket groove 302 and gasket 304 that is from a filter seam 306. In viewing FIG. 9, it is seen that the flange outer wall 242 of FIG. 8 has been removed and instead an annular loop 380 provides the outer wall for the outer gasket 304. A further difference in the present embodiment is that the outer gasket 304 has been molded to provide means for securing the outer gasket in the groove 302. More specifically, outer gasket 304 includes a lip portion 312 which extends into a recessed portion 314 defined by the rim cylindrical wall 316 which provides the inner wall for the gasket groove 302. By molding the gasket 304 in this fashion and providing accommodating means in the rim cylindrical wall portion 316 the retaining lugs 68 of the first embodiment shown in FIGS. 1–6 are no longer needed. Yet another difference in the present embodiment as compared to that of FIG. 8 is an inner ring seal 318 has been moved radially inward and compressed between the seaming lid and a beveled ledge 320 of the baseplate. The inner seal 318 similarly prevents fluid transfer between the baseplate and the seaming lid thereby reducing pressure on the seam 306.

What is claimed is:

1. A spin-on filter comprising:
   a canister having a closed end, a cylindrical sidewall generally coaxially surrounding a central axis and an open end, the canister housing a filter element;
   a baseplate having a threaded hub generally coaxially surrounding said axis and an outer peripheral rim generally coaxially surrounding said hub, the hub providing a central outlet port, ribs joining the threaded hub and the rim with a plurality of inlet ports between adjacent ribs, the rim including a radially outwardly extending flange providing a seat, the flange having a plurality of slots separate from the inlet port; and
   a seaming lid having an outer edge meshed to the sidewall forming a seam, the seaming lid having a peripheral surface interfitting with the seat of the baseplate, the lid including a plurality of tabs sized to be received by the slots, and to project through the slots when the seaming lid is seated on the seat, the tabs being crimped to thereby attach the seaming lid to the base plate.

2. The filter as in claim 1, further comprising an outer gasket fitted into an annular gasket groove that generally coaxially surrounds said axis, the annular gasket groove defined by the combination of the seaming lid and the baseplate having a radially inner wall generally coaxially surrounding said axis provided by the rim, a base provided by the seaming lid, and a radially outer wall generally coaxial with and radially outwardly spaced of said radially inner wall provided by the seaming lid.

3. The filter as in claim 2 wherein the radially inner wall provided by the rim provides retaining means for securing the outer gasket in the annular gasket groove.

4. The filter as in claim 3 wherein the retaining means comprises a plurality of lugs extending horizontally from a top portion of the radially inner wall.

5. The filter as in claim 1, in which the flange further defines a cylindrical channel with the slots at the bottom of the channel and the seaming lid further comprises a ring shaped band extending vertically from the peripheral surface, the tabs provided by the ring shaped band, the ring shaped band being closely fitted into the cylindrical channel.

6. The filter as in claim 1, wherein the baseplate comprises die cast aluminum material and the seaming lid comprises stamped steel.

7. The filter as in claim 1, wherein the tabs are bent at an angle greater than 90 degrees around a bottom portion of the flange, the bottom portion being opposite the seat.

8. The filter as in claim 1, wherein the seaming lid comprises a generally stepped configuration wherein the peripheral surface comprises a disc which is generally radially planar with a ring extending vertically towards the seam.

9. The filter as in claim 1 wherein the filter element defines an central orifice sized to receive the hub, the hub closely fitted in the central orifice, the hub providing a lip extending radially outward therefrom with an inner seal compressed between the lip and the filter element.

10. The filter as in claim 1 further comprising first inner ring seal compressed between the seaming lid and the baseplate and a second inner ring seal compressed between the baseplate and canister.

11. The filter as in claim 1 wherein the canister comprises a neck in the sidewall near the open end between the seam and the baseplate, the neck having an inner diameter that is smaller than an outer diameter of the baseplate.

12. A spin-on filter comprising:
    a canister having a closed end, a cylindrical sidewall generally coaxially surrounding a central axis and an open end, the filter housing means for filtering a fluid;
    a baseplate having a threaded hub generally coaxially surrounding said axis and an outer rim generally coaxially surrounding said hub, ribs connecting the threaded hub and the rim, a plurality of inlet ports defined between the ribs;
    a seaming lid having an outer portion generally coaxially surrounding said axis fastened to the sidewall and an inner portion generally coaxial with and radially spaced inwardly of said outer portion adapted to interfit with the rim; and
    an annular gasket groove generally coaxially surrounding said axis for receiving an outer gasket defined by a combination of the baseplate and the seaming lid, the annular gasket groove having a radially inner wall generally coaxially surrounding said axis provided by the rim, a base provided by the seaming lid, and a radially outer wall generally coaxial with and radially spaced outwardly of said radially inner wall provided by the seaming lid.

13. The filter as in claim 12 wherein the rim further includes a retaining means for securing an outer gasket in the annular gasket groove.

14. The filter as in claim 12 further including means for torque transfer between the seaming lid and the baseplate.

15. The filter as in claim 12 wherein the rim includes a seating surface extending from said radially inner wall, the base provided by the seaming lid being seated on the seating surface, the rim defining a plurality of slots and the inner portion of the seaming lid comprising a plurality of tabs adapted to be received by the slots.

16. The filter as in claim 12 wherein the seaming lid includes an outer seaming edge generally coaxially surrounding said axis that is seamed to the sidewall of the canister.

17. The filter as in claim 12 further comprising a first ring seal compressed between the baseplate and the seaming lid and a second ring seal compressed between the baseplate and the canister.

18. A spin-on filter comprising:
    a canister having a closed end, a cylindrical sidewall generally coaxially surrounding a central axis and an open end, the canister housing a filter element;
    a baseplate having a threaded hub generally coaxially surrounding said axis and an outer peripheral rim generally coaxially surrounding said hub, a plurality of ribs joining the threaded hub to the rim, a plurality of fluid inlet ports defined between the ribs, the rim including a cylindrical wall generally coaxially surrounding said axis and a seating surface extending radially outward from the cylindrical wall, the rim defining a cylindrical channel generally along the cylindrical wall, the rim further defining a plurality of slots at the bottom of the cylindrical channel;
    a seaming lid comprising a disc shaped portion seated on the seating surface, a ring shaped wall extending vertically from the disc shaped portion and a cylindrical band extending from the disc shaped portion generally opposite said ring shaped wall, the cylindrical band providing a plurality of tabs, the cylindrical band fitted in the cylindrical channel with the tabs fitted in the slots, the tabs being folded to sufficiently secure the seaming lid to the baseplate, the seaming lid further comprising an outer seaming edge extending radially outward from the ring shaped wall, at least a part of the outer seaming edge being meshed with said open end of the sidewall to form a seam;

an outer gasket fitted into an annular gasket groove generally coaxially surrounding said axis, the annular gasket groove defined by the cylindrical wall, the disc shaped portion and the ring shaped wall.

19. The spin-on filter as in claim 18 further comprising a first ring seal compressed between the baseplate and the seaming lid, a second ring seal compressed between the baseplate and the canister.

20. The spin-on filter as in claim 18 wherein the outer edge includes an annular segment between the seam and the ring shaped wall, the annular segment engaging the baseplate to transfer force between the canister and the baseplate, the gasket groove thereby being disposed radially inward from the seam at a substantial distance.

21. The spin-on filter as in claim 20 wherein the rim defines a stepped recessed ledge radially beyond the gasket groove, the annular segment engaging the ledge.

22. The spin-on filter as in claim 18 wherein the tabs are folded at an angle greater than 90 degrees around the rim.

23. The spin-on filter as in claim 18 wherein substantially all of the outer seaming edge portion is meshed into the seam, the seam being adjacent to the ring shaped wall of the seaming lid.

24. The spin-on filter as in claim 18 wherein the canister comprises a neck in the sidewall, the neck is located near the open end and between the seam and the rim, and the neck has an inner diameter that is smaller than an outer diameter of the rim.

* * * * *